UNITED STATES PATENT OFFICE.

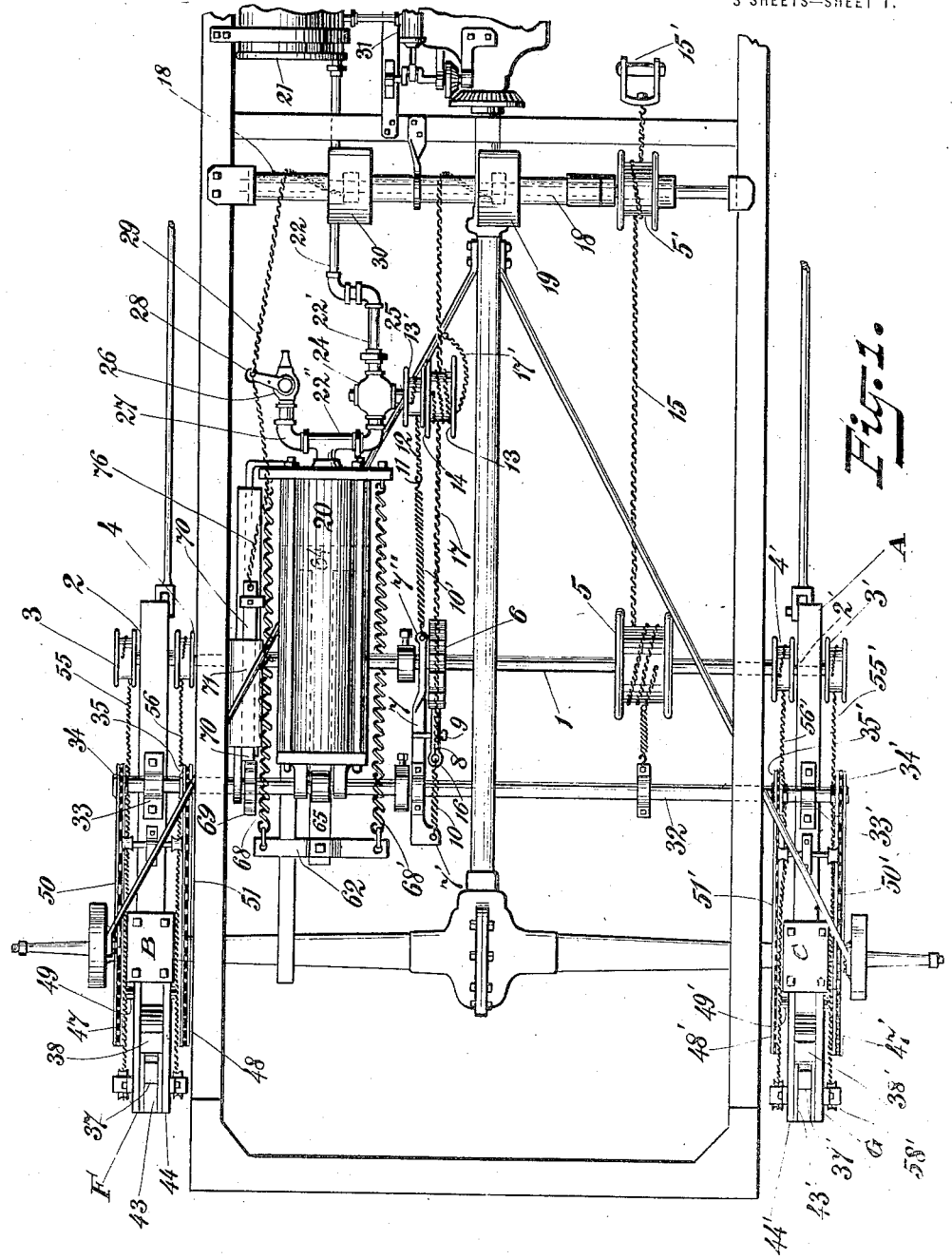

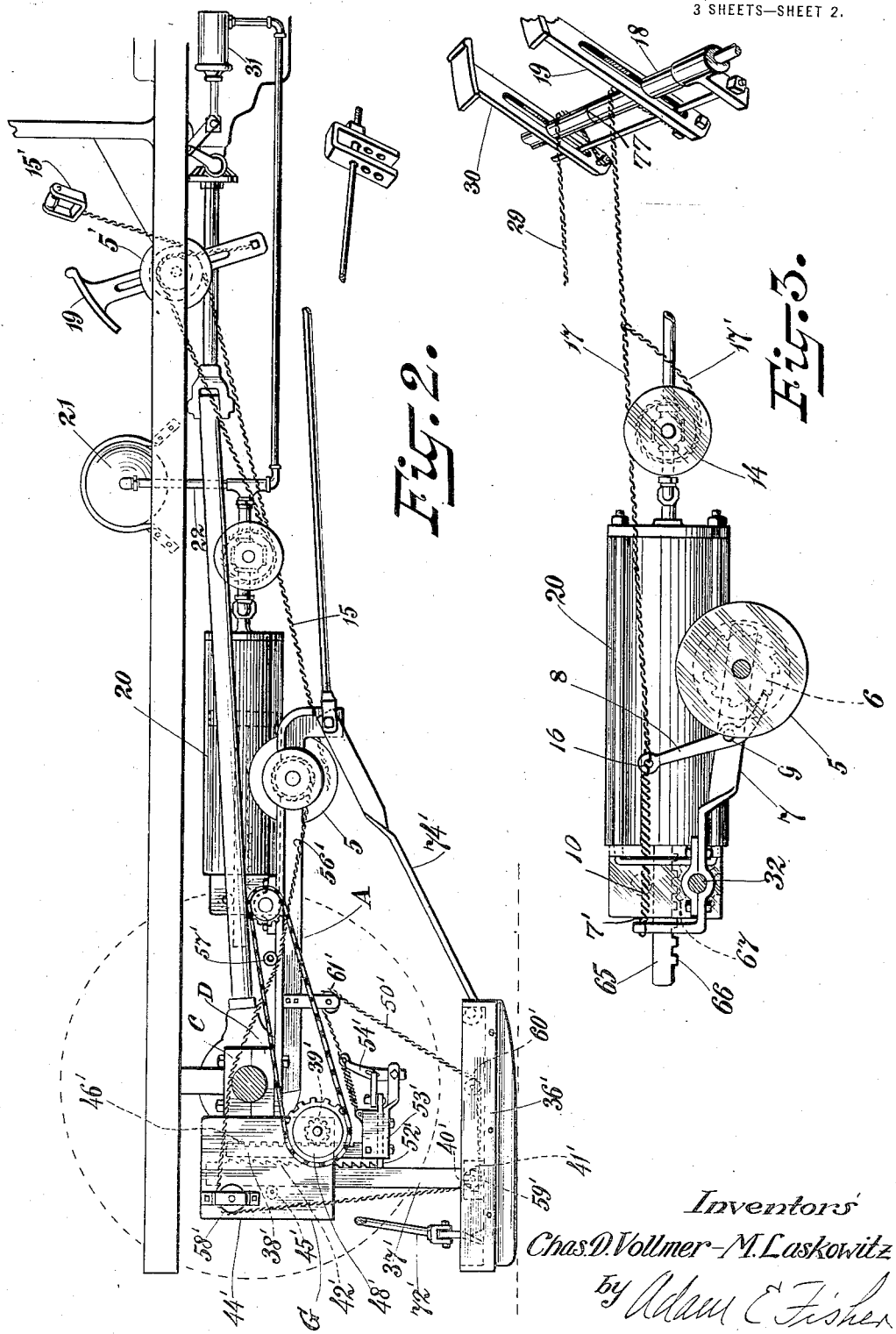

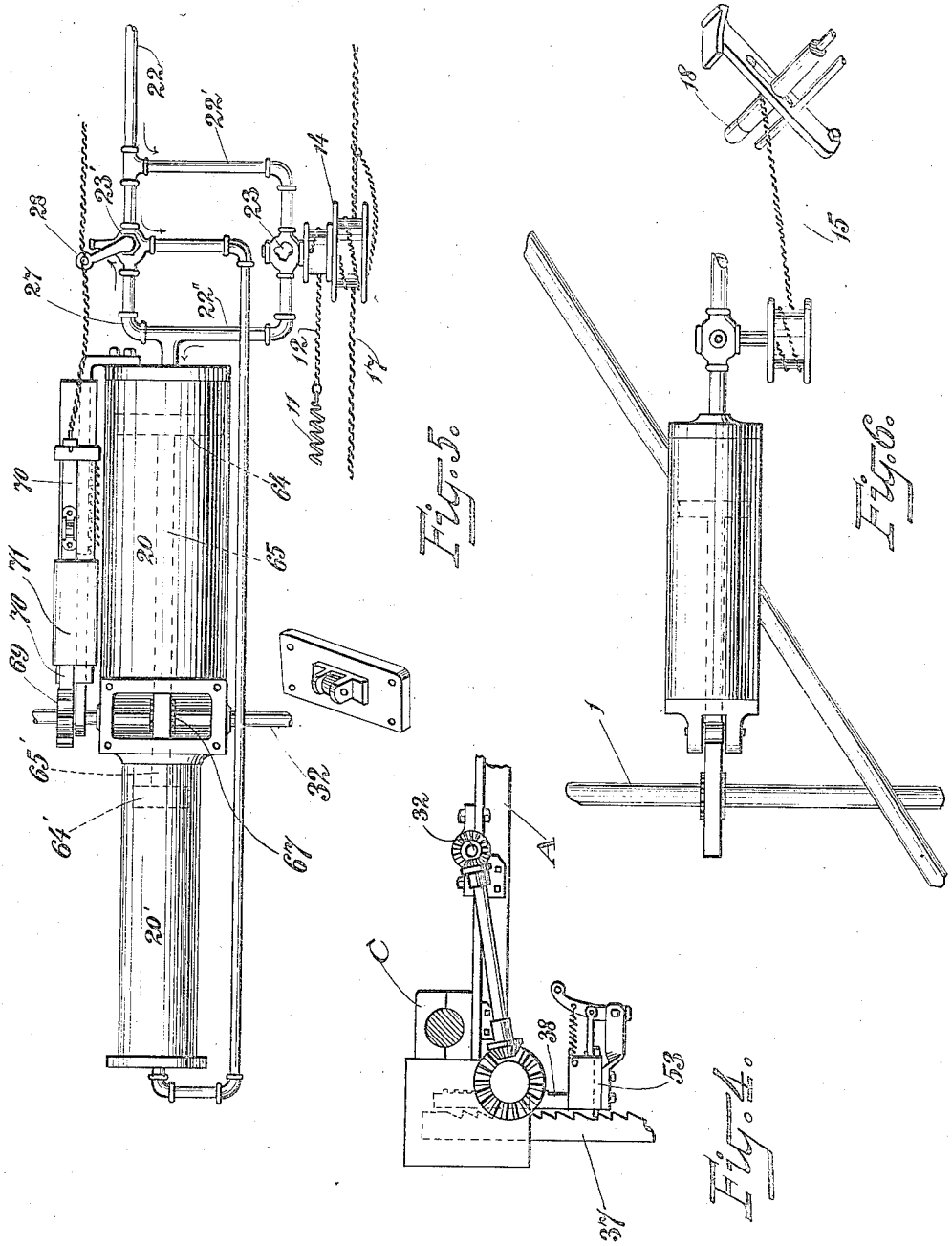

CHARLES D. VOLLMER AND MICHAEL LASKOWITZ, OF ST. LOUIS, MISSOURI.

AUTOMOBILE JACK, LOCK, AND ANTISKID.

1,325,600.  Specification of Letters Patent.  Patented Dec. 23, 1919.

Application filed April 29, 1918. Serial No. 231,431.

*To all whom it may concern:*

Be it known that we, CHARLES D. VOLLMER and MICHAEL LASKOWITZ, citizens of the United States, residing in the city of St. Louis, State of Missouri, have invented new and useful Improvements in Automobile Jacks, Locks, and Antiskids, of which the following is a specification, reference being had to the accompanying drawings.

This invention pertains to jacks, and more particularly to automobile jacks, and one object of the invention is to provide a jack which may be adjusted or attached readily to any automobile for the purpose of raising the automobile or any part thereof from contact with the ground, as desired.

Another object is to provide an apparatus which can be utilized as a lock and antiskid, as well as for a jack.

Another object is to provide a device of this character which may be operated by either compressed air, hand power, or motor power, or otherwise.

Another object is to provide such a device in a simple, strong, and practical form, best adapted to meet the purposes and requirements of actual use.

With these and other objects in view, attention is called to the accompanying drawings, constituting a part of this specification, and wherein—

Figure 1 represents a plan view of my apparatus in one of its forms of construction as attached to the chassis of an automobile, and adapted to act upon the rear portion thereof through the rear axle;

Fig. 2 is a side elevation of the apparatus as shown in Fig. 1;

Fig. 3 is a detail showing an assembly of the air cylinder, piston rod and rack, road gage ratchet wheel and pawl, the double spool controlling the rotary inlet valve, and the control pedals;

Fig. 4 is a detail showing a modification employing gear and shaft transmission instead of chain and sprocket transmission;

Fig. 5 is a detail modification employing a secondary air cylinder to do the work of the back springs shown in the main construction;

Fig. 6 is a detail modification employing an air cylinder and rack mechanism to do the work of the lift rope shown in main construction.

Referring more particularly to the drawings, our improved jack, in the form of construction shown in the drawings, consists of a suitable sub-frame represented by A which supports the working elements of the jack, and provides means of attachment of the jack to the axle bearing of the automobile at the under side thereof through suitable axle clamps as B and C. Within the sub-frame A is mounted the transverse control shaft 1 journaled at 2 and 2'. Upon this shaft are rigidly mounted at either end thereof the adjustment pulleys 3, 4, 3' and 4', and medially upon the same shaft are rigidly mounted the lift spool 5, and the road gage ratchet wheel 6. Extending rearwardly from the shaft 1 is the bracket 7 supported by said shaft and shaft 32 hereinafter described; and medially of the bracket 7 is mounted the road gage dog 8 by means of the pivot bolt 9. A spring 10 subtending the points 7' and 16 normally holds the dog 8 in engagement with the ratchet 6. A spring 10' extending forwardly from the point 7'' on the bracket 7, is attached at 11 to the rope 12 and said rope is wound around and fastened to one side 13', of the double spool 14, and the action of said spring 10' is normally to counter-act the spring 10 and hold the spool 14 in definite relation to the other elements.

From the upper end of said road gage dog 8 at the point 16 is attached a control rope 17, the same extending forwardly and around a double, journaled shaft 18 and 18' mounted transversely in the forward portion of the chassis frame. Said shaft sections 18 and 18' rotate independently, their ends meeting freely at the point 77. After passing around said shaft 18, the end of the said rope 17 is attached to the lower extremity of the vertically reciprocating pedal 19. A relatively loose shunt rope 17'' branches from the main rope 17 and encircles and is fastened to the other side 13 of the spool 14.

On one side of the road gage ratchet 6 is mounted the air cylinder 20, the same being supplied with compressed air from the air tank 21 through the connecting pipes 22, 22' and 22''. A rotary inlet valve 23 is mounted within its casing 24, connecting the inlet pipes 22, 22' and 22'', and the shaft 25 of said inlet valve supports the double spool 14 aforesaid, said double spool being rigidly mounted thereon. An escape valve 26 is mounted within the branch pipe 27, and has a lever handle 28. From the end of this lever handle 28 extends forwardly a rope 29 which passes around the aforesaid shaft 18' in the same direction as the rope 17 and the extremity of said rope 29 after passing around said shaft is attached to the lower end of the vertically mounted reciprocating pedal 30. Any suitable air compressor as 31 may be geared to the engine for the purpose of compressing air into the air tank 21. Rearwardly of the control shaft 1 is mounted the jack shaft 32, the same being journaled transversely across the sub-frame A at the points 33 and 33'. At the extremities of this jack shaft 32 are rigidly mounted the jack sprockets 34, 35, and 34' and 35', one being located on each side of the journals 33 and 33' in order to balance one another in respect to the strain transmitted through said sprockets. Rearwardly of the jack shaft 32 and under the axle of the chassis adjacent to the wheels thereof at the inner side are located the jacks proper F and G.

These jacks comprise suitable ground shoes as 36, 36', the stanchions 37, 37', the climbing racks 38, 38', and the climbing gears 39, 39', and coöperating elements. The stanchions 37—37' are mounted medially on the upper surface of the shoes 36—36', by means of knuckles 40—40' adapted to play transversely within the grooves 41—41' cut across the shoes 36 and 36', the purpose whereof will be hereinafter described.

The stanchions 37—37' have ratchets 42—42' cut along their inner edges from the top to medial points thereon. Said stanchions are adapted to slide within guideways 43—43' formed within the casings 44 and 44', and suitable rollers as 45—45' are mounted within said casings in order to facilitate the sliding of said stanchions therethrough.

The climbing racks 38 and 38' are formed with rack teeth 46—46' along the forward edge thereof, and said climbing racks 38 and 38' are mounted likewise in guide-ways within the casings F and G, and adapted to slide back and forth therein immediately in front of the stanchions 37—37'. The climbing gears 39—39' are mounted within the casings F and G in mesh with the racks 46—46'. Sprockets 47 and 48, and 47' and 48' are mounted exteriorly and rigidly in connection with the gears 39—39' upon their shafts 49 and 49'. The sprockets 47, and 48, and 47' and 48' are in alinement with the sprockets 34 and 35, and 34' and 35'. Sprocket chains 50, 51, 50' and 51' pass over and connect the aforesaid alined sprockets. Sliding dogs 52 and 52' are mounted within their boxes 53 and 53' rigidly attached at the lower ends of the climbing racks 38 and 38', and are adapted to play into and lock the climbing racks 38 and 38' in relation to the stanchions 37 and 37'. Suitable triggers 54 and 54' are pivoted in connection with said sliding dogs and control the same. Jack lifts 55, 55', 56 and 56' are fastened to the pulleys 3 and 4, and 3' and 4' and extend forwardly under and over the tension pulleys 57, 58, 59, 60, 61 and 57', 58', 59', 60' and 61', and connect with the triggers 54 and 54'. Suitable end braces as 72 and 72' and forwardly reaching stay rods 74 and 74' serve to steady the entire apparatus.

The air cylinder 20 is provided with the piston 64 and the outwardly reciprocating piston rod 65, and upon the lower side of the piston rod 65 is formed the traveling rack 66 adapted to mesh with the gear 67 rigidly mounted upon the jack shaft 32 immediately under the rack 66. At the forward end of the rack 66 is formed the cross-head 62, and back springs 68 and 68' attached to said cross-head and to suitable points on the cylinder casing in the rear thereof normally tend to pull the rack 66 backward so as to force the piston 64 back into the air cylinder 20. Instead of the back springs 68—68', a secondary air cylinder 20', piston 64', and piston rod 65' may be used to reverse the action of the primary cylinder 20, the rods 65—65' being joined, and air being alternated into the cylinders through branch pipes controlled by a double valve 23' which exhausts the cylinder 20, and simultaneously fills the cylinder 20'. This modification is shown in Fig. 5. To one side of the air piston 20 and rigidly mounted upon the jack shaft 32 is the release ratchet wheel 69 and a release dog 70 is slidingly mounted within its guide 71 and adapted to play into said ratchet. The rear end of said release dog 70 is loosely connected by the rope 76 to the aforesaid lever handle 28. The sub-frame A is fastened to the chassis by means of suitable adjustable clamps as B and C, as aforesaid, and may be so formed as to afford a ready means of attachment of the apparatus to any ordinary automobile. Shaft and gear transmission, as shown in Fig. 4, may be used instead of the chain and sprocket transmission described to operate the jacks. A lift rope 15 is wound around and fastened to the spool 5, extends forwardly and around the spool 5' loosely mounted on the shaft 18, and ends in the handle 15'.

In operation and with the apparatus properly adjusted throughout its several elements, it is understood that the working of the automobile engine normally keeps a supply of compressed air in the air tank 21 under sufficient pressure to raise the weight of the car when the mechanism is set in operation. The ground shoes being in their elevated position, the pedal 19 is forced downward releasing the road gage dog 8 from the road gage ratchet 6. This permits the ground shoes 36 and 36', and the stanchions 37 and 37' to fall to the ground. Simultaneously, the sliding dogs 52 and 52' lock the climbing racks 38 and 38' in a fixed relation upon the ratchets 42 and 42' cut in the stanchions 37 and 37'. The pedal 19 being further depressed, the shunt rope 17' is drawn taut around the side 13 of the spool 14, thereby causing said spool 14 to partially revolve, and opening the rotary inlet valve 23, whereby compressed air is admitted into the end of the cylinder 20. This air forces the piston 64, the piston rod 65 and traveling rack 66 outwardly over the gear 67. This causes the jack shaft 32 to revolve and the power being transmitted through the sprockets 34, 35, 34', 35' and 47, 48, 47', 48', and sprocket chains 50, 51, 50' and 51', to the climbing gears 39—39', said gears are made to climb the racks 38 and 38', thereby elevating the casings 44 and 44' and the axle of the chassis to which said casings are clamped. The load of the rear portion of the automobile now rests upon the ground shoes 36 and 36', the wheels of the automobile being elevated from the ground, as shown in dotted lines in Fig. 2.

To unload the car from the jacks and restore the same to its normal position as at the beginning of this description of operation, the pedal 30 is depressed, causing, first, the escape valve 26 to be opened and letting the air out of the end of the cylinder 20. The pedal 30 being further depressed, the release dog 70 is drawn out of engagement with the ratchet 69, thereby permitting the load to descend until the wheels of the car rest upon the ground. The handle 15' is then pulled upward, whereby the control shaft 1 is revolved in a reverse direction and the jack lifts 55, 55', 56 and 56' first release the sliding dogs 52 and 52' from the ratchets 42 and 42', and then exert their lifting force to raise and elevate the shoes 36 and 36' into their original position.

It will be noted that as the shoes 36—36' are raised or lowered, the knuckles 40—40' are caused to reciprocate within the grooves 41—41' caused by the torque effect of the braces 72 and 73.

It is obvious that we have here provided a practical emergency automobile jack, and one which will likewise serve as a lock, and an anti-skid device.

While we have herein described a certain specific manner and method of constructing and assembling our apparatus, it is understood that we may vary from the same in minor details, not departing from the spirit of our invention, so as best to construct our improved jack, lock and anti-skid to meet all practical requirements, as defined in the appended claims.

What we claim to be new and patentable is:

1. In combination with an automobile, a jack, lock and anti-skid for the same, comprising a plurality of casings mounted in connection with the chassis and having vertical guide-ways formed therein; a stanchion slidingly connecting with each casing through a guide-way and having a ratchet cut along one side; a ground shoe joined beneath each stanchion; a climbing bar slidingly connecting with each casing through a guide-way and having a climbing rack cut along one side; a catch pawl movably mounted in connection with each climbing bar and adapted automatically to lock the climbing rack and bar in fixed relation to its adjacent stanchion; a climbing gear mounted in connection with each casing and meshing with its climbing rack; and means for rotating said gears so as to elevate and lower the car upon said ground shoes.

2. In combination with an automobile, a jack, lock and anti-skid for the same, comprising a plurality of casings, mounted in connection with the chassis and having vertical guide-ways formed therein; a stanchion slidingly connecting with each casing through a guide-way and having a ratchet cut along one side; a ground shoe joined beneath each stanchion; a climbing bar slidingly connecting with each casing through a guide-way and having a climbing rack cut along one side; a catch pawl movably mounted in connection with each climbing bar and adapted automatically to lock the climbing rack in fixed relation to its adjacent stanchion; a climbing gear mounted in connection with each casing and meshing with its climbing rack; means for rotating said gears so as to elevate and lower the car upon said ground shoes; and means for unloading said ground shoes and elevating same.

3. In combination with an automobile, a jack, lock and anti-skid for the same, comprising a plurality of casings mounted in connection with the chassis and having vertical guide-ways formed therein; a stanchion slidingly connecting with each casing through a guide-way and having a ratchet cut along one side; a ground shoe joined beneath each stanchion; a climbing bar slidingly connecting with each casing through a guide-way and having a climbing rack cut along one side; a catch pawl movably mounted in connection with each climbing bar and adapted automatically to lock the climbing rack in fixed relation to its adjacent stanchion; a climbing gear mounted in connection with each casing and meshing with its climbing rack; an air pressure tank; an air compressor mounted in connection with the engine as means for compressing air into said tank; an air cylinder with piston and rod connected to said air tank; a rack cut along one side of the piston rod; a gear meshing with said rack; a shaft rigidly joining said gear with said climbing gear as means for transmitting power from said air pressure tank to said jack mechanism; control valves for admitting compressed air into and permitting its escape from said air cylinder for loading and unloading the car onto said ground shoes; and means for unloading said ground shoes and elevating the same.

4. An automobile jack, lock and anti-skid, comprising a casing; vertically extensible ratchet and rack members slidingly mounted therein, the upper rack member being adapted to engage the chassis and elevate the same when extended; means for extending and collapsing said members consisting of a catch mounted at the lower end of the rack member and engaging and locking the ratchet member against collapse, a gear mounted on the casing and meshing with the rack member; means for rotating said gear along said rack member; and means for releasing said catch to permit the ratchet and rack members to collapse.

CHARLES D. VOLLMER.
MICHAEL LASKOWITZ.

Witnesses:
A. K. DOHLE,
M. L. GERAU.